United States Patent
Laflamme et al.

(10) Patent No.: US 12,460,183 B2
(45) Date of Patent: Nov. 4, 2025

(54) MATURE CARDIOMYOCYTE COMPOSITIONS

(71) Applicant: UNIVERSITY HEALTH NETWORK, Toronto (CA)

(72) Inventors: Michael Alan Laflamme, Toronto (CA); Wahiba Dhahri, Toronto (CA)

(73) Assignee: University Health Network

(*) Notice: Subject to any disclaimer, the term of this patent is extended or adjusted under 35 U.S.C. 154(b) by 284 days.

(21) Appl. No.: 16/701,734

(22) Filed: Dec. 3, 2019

(65) Prior Publication Data

US 2020/0407687 A1 Dec. 31, 2020

Related U.S. Application Data

(60) Provisional application No. 62/868,233, filed on Jun. 28, 2019.

(51) Int. Cl.
*C12N 5/077* (2010.01)
*C12N 5/0735* (2010.01)
*C12N 5/074* (2010.01)

(52) U.S. Cl.
CPC ......... *C12N 5/0657* (2013.01); *C12N 5/0606* (2013.01); *C12N 5/0607* (2013.01); *C12N 2500/25* (2013.01); *C12N 2501/115* (2013.01); *C12N 2501/155* (2013.01); *C12N 2501/16* (2013.01); *C12N 2501/165* (2013.01); *C12N 2501/33* (2013.01); *C12N 2501/415* (2013.01); *C12N 2506/02* (2013.01); *C12N 2506/03* (2013.01)

(58) Field of Classification Search
CPC .. C12N 5/0657; C12N 5/0606; C12N 5/0607; C12N 2501/115; C12N 2501/155; C12N 2501/16; C12N 2501/165; C12N 2501/33; C12N 2501/415; C12N 2506/02; C12N 2506/03
See application file for complete search history.

(56) References Cited

U.S. PATENT DOCUMENTS 9,453,201 B2   9/2016  Palecek et al.
2015/0329825 A1  11/2015  Herron et al.

FOREIGN PATENT DOCUMENTS

WO   2016/131137   8/2016
WO   2018/098597   6/2018

OTHER PUBLICATIONS

Rodriguez et al. (2019). Substrate Stiffness, Cell Anisotropy, and Cell-Cell Contact Contribute to Enhanced Structural and Calcium Handling Properties of Human Embryonic Stem Cell-Derived Cardiomyocytes. ACS Biomaterials Science & Engineering, 5(8), 3876-3888. (Year: 2019).*

Herron et al., (2016). Extracellular matrix mediated maturation of human pluripotent stem cell derived cardiac monolayer structure and electrophysiological function. Circulation Arrhythmia Electrophysiology, 9(4), e003638. (Year: 2016).*

(Continued)

*Primary Examiner* — Kara D Johnson
(74) *Attorney, Agent, or Firm* — Fish & Richardson P.C.

(57) ABSTRACT

Provided herein are methods for large-scale in vitro maturation of cardiomyocytes derived from human pluripotent stem cells, compositions prepared by these methods, and use of these compositions in cardiac regeneration.

12 Claims, 10 Drawing Sheets
(10 of 10 Drawing Sheet(s) Filed in Color)

(56) References Cited

OTHER PUBLICATIONS

Le et al., (2019). Expansion culture of human pluripotent stem cells and production of cardiomyocytes. Bioengineering, 6(2) 48. (Year: 2019).*

Culture of adherent cells using roller bottles. Technical User's Guide [online]. Thermo Scientific. [retrieved May 4, 2022]. Retrieved from the Internet: <URL: https://assets.fishersci.com/TFS-Assets/LCD/manuals/Nunc-Roller-Bottles-Technical-Users-Guide-TUGLSPRLRBTLS.pdf> (Year: 2015).*

Lee et al., (2017). Human pluripotent stem cell-derived atrial and ventricular cardiomyocytes develop from distinct mesoderm populations. Cell Stem Cell, 21(2) 179-194.e4. (Year: 2017).*

Protze et al., (2016) Sinoatrial node cardiomyoctes derived from human pluripotent cells function as a biological pacemaker. Nature Biotechnology, 35, 56-68 (Year: 2016).*

Burridge et al., "A universal system for highly efficient cardiac differentiation of human induced pluripotent stem cells that eliminates interline variability," PLoS ONE 6:e18293:1-13 (2011).

Burridge et al., "Chemically defined and small molecule-based generation of human cardiomyocytes," Nat Methods 11(8):855-60 (2014).

Chen et al., "Chemically defined conditions for human iPS derivation and culture," Nat Methods 8:424-9 (2011).

Herron et al., "Extracellular matrix mediated maturation of human pluripotent stem cell derived cardiac monolayer structure and electrophysiological function," Circ Arrhythm Electrophysiol. 9(4):1-23 (2016).

Hovatta et al., "A culture system using human foreskin fibroblasts as feeder cells allows production of human embryonic stem cells," Human Reprod. 18(7):1404-09 (2003).

Kattman et al., "Stage-specific optimization of activin/nodal and BMP signaling promotes cardiac differentiation of mouse and human pluripotent stem cell lines," Cell Stem Cell 8(2):228-40 (2011).

Kennedy et al., "Development of the hemangioblast defines the onset of hematopoiesis in human ES cell differentiation cultures," Blood 109:2679-87 (2007).

Lee et al., "Simultaneous voltage and calcium mapping of genetically purified human iPS cell-derived cardiac myocyte monolayers," Circ Res. 110(12):1556-1563 (2012).

Lee et al., "Human pluripotent stem cell-derived atrial and ventricular cardiomyocytes develop from distinct mesoderm populations," Cell Stem Cell 21(2):179-94 (2017).

Lian et al., "Robust cardiomyocyte differentiation from human pluripotent stem cells via temporal modulation of canonical Wnt signaling," PNAS. 109:e1848-57 (2012).

Ludwig et al., "Feeder-independent culture of human embryonic stem cells," Nat Methods 3(8):637-46 (2006).

Ma et al., "High purity human-induced pluripotent stem cell-derived cardiomyocytes: electrophysiological properties of action potentials and ionic currents," Am J Physiol Heart Circ Physiol. 301(5):H2006-H2017 (2011).

Maitz, "Applications of synthetic polymers in clinical medicine," Biosurface Biotrib. 1:161-76 (2015).

Thomson et al., "Embryonic stem cell lines derived from human blastocysts," Science 282(5391):1145-7 (1998).

Wang et al., "Scalable expansion of human induced pluripotent stem cells in the defined xeno-free E8 medium under adherent and suspension culture conditions," Stem Cell Res. 11(3):1103-16 (2013).

Zhang et al., "Extracellular matrix promotes highly efficient cardiac differentiation of human pluripotent stem cells: The Matrix Sandwich Method," Circ Res. 111(9):1125-1136 (2012).

* cited by examiner

MATURE CARDIOMYOCYTE COMPOSITIONS

CROSS-REFERENCE TO RELATED APPLICATION

This application claims priority from U.S. Provisional Application 62/868,233, filed Jun. 28, 2019, the disclosure of which is incorporated herein by reference in its entirety.

BACKGROUND OF THE INVENTION

Human pluripotent stem cells (hPSCs) have been used to generate functional cardiomyocytes (CMs) for application in cardiac regeneration. After transplantation into the infarcted hearts of mice, rats, guinea pigs, and non-human primates, hPSC-derived cardiomyocytes (hPSC-CMs) can stably engraft and improve left ventricle contractile function. However, most of the current protocols for generating hPSC-CMs promote the development of immature CMs with immature metabolic, structural, electrophysiological, and contractile phenotype. Immature CMs may have limited translational potential and may even contribute to ventricular tachyarrhythmias that have been observed with animals engrafted with these cells.

Methods for promoting maturation of hPSC-CMs in vitro have been reported, including prolonged duration in culture, electromechanical conditioning, and hormone treatment. These methods, however, are not scalable to produce large cell quantities (about $10^9$ to $10^{10}$ cells) required for regenerative cell therapy. Thus, there is an urgent need for methods of producing mature hPSC-derived CMs on a large scale.

SUMMARY OF THE INVENTION

The present disclosure provides a method of generating a cell population enriched for mature cardiomyocytes (e.g., mature ventricular cardiomyocytes), comprising: (a) providing a human cardiac progenitor cell (e.g., a human ventricular cardiomyocyte progenitor), (b) seeding the human cardiac progenitor cell on a soft, biocompatible substrate, and (c) culturing the seeded cell in a cardiac base medium inside a tissue culture container for four or more days under conditions that allow development of the seeded cell into mature cardiomyocytes, thereby producing a cell population enriched for mature cardiomyocytes.

In another aspect, the present disclosure provides a method of generating a cell population enriched for mature cardiomyocytes (e.g., mature ventricular cardiomyocytes), comprising: (a) providing a human cardiac progenitor cell (e.g., a human ventricular cardiomyocyte progenitor) or an immature human cardiomyocyte (e.g., an immature ventricular cardiomyocyte), (b) seeding the human cell on a soft, biocompatible substrate, and (c) culturing the seeded cell in a cardiac base medium inside a tissue culture container for four or more days under conditions that allow development of the seeded cell into mature cardiomyocytes, wherein the cardiac base medium is induced to move during the culturing, thereby producing a cell population enriched for mature cardiomyocytes.

In some embodiments of these methods, the human cardiac progenitor cell or immature cardiomyocyte is derived from a human pluripotent stem cell (hPSC) such as a human embryonic stem cell and a human induced pluripotent stem cell. In further embodiments, the human cardiac progenitor cell or immature cardiomyocyte is derived from the hPSC by (i) culturing the hPSC for about 1-3 days in the presence of an activator of a bone morphogenetic protein 4 (BMP4) receptor, a fibroblast growth factor (FGF), and an activator of the Activin signaling pathway, and (ii) culturing the cell(s) from step (i) in the presence of a Wnt signaling antagonist for about 1-3 or more days. For example, the human cardiac progenitor cell or immature cardiomyocyte is derived from the hPSC by (i) culturing the hPSC in the presence of BMP4, basic FGF, and Activin A for about 1-3 days, and (ii) culturing the cell(s) from step (i) in the presence of IWP2 and optionally VEGF for about 1-3 or more days. In other embodiments, the human cardiac progenitor cell or immature cardiomyocyte is derived from the hPSC by (i) culturing the hPSC in the presence of one or more Wnt signaling agonists, and (ii) culturing the cell(s) from step (i) in the presence of one or more Wnt antagonists.

In some embodiments, the present methods further comprise the step (d) of culturing the cell(s) from step (c) in the presence of insulin for about one to four weeks.

In some embodiments of the present methods, the soft, biocompatible substrate is silicone such as polydimethylsiloxane (PDMS) membrane. In some embodiments, the substrate such as the PDMS membrane is coated with extracellular matrix proteins comprising one or more of laminins, collagens, heparin sulfate proteoglycans, fibronectin, vitronectin, and poly-1 dopamine, or coated with growth factor reduced Matrigel®, an assortment of extracellular matrix (ECM) proteins derived from Engelbreth-Holm-Swarm tumors, or an equivalent thereof.

In some embodiments of the methods, step (c) and optionally step (d), when present, are performed with movement of the cardiac base medium, for example, by moving (e.g., rotating, shaking, or rocking) the tissue culture container, or by stirring the culture medium within the container with, e.g., a motorized propeller. The substrate may be alternately submerged in the cardiac base medium and exposed to air due to the movement.

In some embodiments, the culture volume in step (c) and step (d), when present, is about 100 mL to 500 L, e.g., about 100 mL, 250 mL, 500 mL, 1 L, 3 L, 5 L, 10 L, 25 L, 50 L, 100 L, 200 L, 250 L, or 500 L, or within a range between any of the aforementioned numbers, such as 100 mL to 1 L, 1 L to 10 L, 10 L to 100 L, 100 L to 250 L, or 250 L to 500 L.

In another aspect, the present disclosure provides a plurality of mature cardiomyocytes obtained by the methods described herein.

In a further aspect, the present disclosure provides a pharmaceutical composition consisting of a cellular component and a carrier component, wherein the cellular component is a cell population in which more than 50% of the cells are mature cardiomyocytes, and wherein the carrier component comprises a pharmaceutically acceptably carrier, wherein the mature cardiomyocytes are characterized by, as compared to immature cardiomyocytes: (i) increased expression of one or more of Cx43, MYH7, MYH6, TNNI3, TNNI1, MYL2, MYL7, S100A1, CASQ2, PLB, SCNA5, COX6A2, and CKM; and/or (ii) increased conduction velocity, slower spontaneous beating rate, and/or enhanced calcium transient amplitude.

Provided herein are also methods of treating a cardiomyopathy condition in a subject in need thereof, comprising administering to the subject the present plurality of cells or pharmaceutical composition. Also provided are the present plurality of cells or pharmaceutical composition for use in treating a cardiomyopathy condition; and the use of the present plurality of cells for the manufacture of a medicament for treating a cardiomyopathy condition. In some embodiments, the cardiomyopathy is myocardial infarct.

Other features, objects, and advantages of the invention are apparent in the detailed description that follows. It should be understood, however, that the detailed description, while indicating embodiments and aspects of the invention, is given by way of illustration only, not limitation. Various changes and modification within the scope of the invention will become apparent to those skilled in the art from the detailed description.

BRIEF DESCRIPTION OF THE FIGURES

The patent or application file contains at least one drawing executed in color. Copies of this patent or patent application publication with color drawings will be provided by the United States Patent and Trademark Office upon request and payment of the necessary fee.

DETAILED DESCRIPTION OF THE INVENTION

Figure 1:
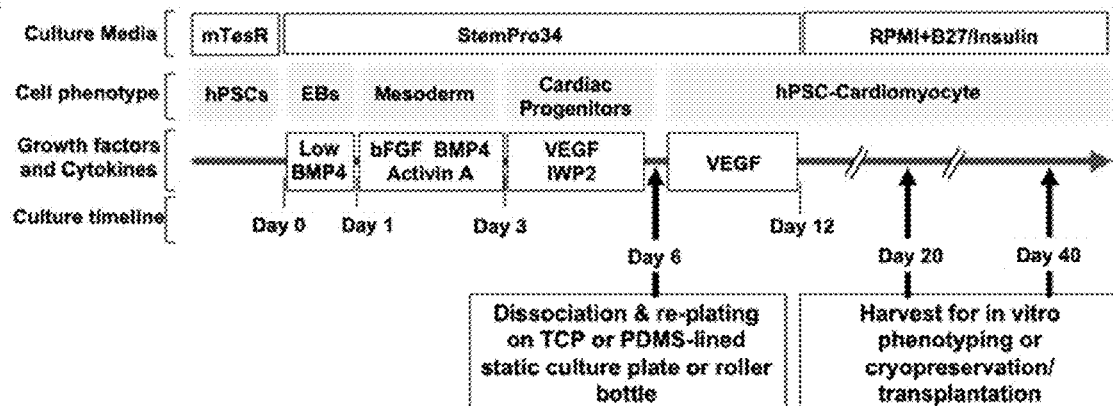
FIG. 1 illustrates a strategy for in vitro hPSC cardiac differentiation and maturation. Panel a shows a detailed schematic for a cardiac differentiation and maturation protocol. Cell culture media used are mTeSR™ (STEMCELL Technologies), StemPro-34 (Thermo Fisher Scientific), and RPMI/B27-insulin (Thermo Fisher Scientific). Panel b shows the appearance and properties of polydimethylsiloxane (PDMS) membranes and overview of their use for two-dimensional (2D) hPSC-CM culture in either roller bottles or static plates (e.g., maxi-plates). Panel c is two graphs comparing CM yield and purity (% of cardiac troponin T (cTnT) positive cells) obtained from either static (maxi-plates) or dynamic (roller bottles) culture. Panel d is a table comparing the requirements for generating $1 \times 10^8$ hPSC-CMs using the two formats. RB: roller bottles. EB: embryoid bodies. BMP4: bone morphogenetic protein 4. bFGF: beta fibroblast growth factor. VEGF: vascular endothelial growth factor. IWP2: Inhibitors of Wnt production.
Figure 1:
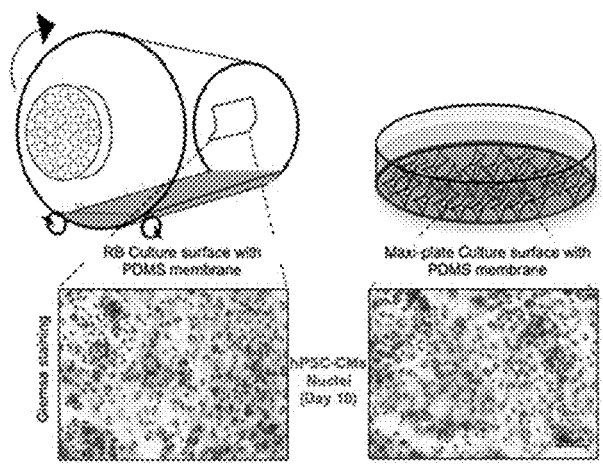
Figure 1:
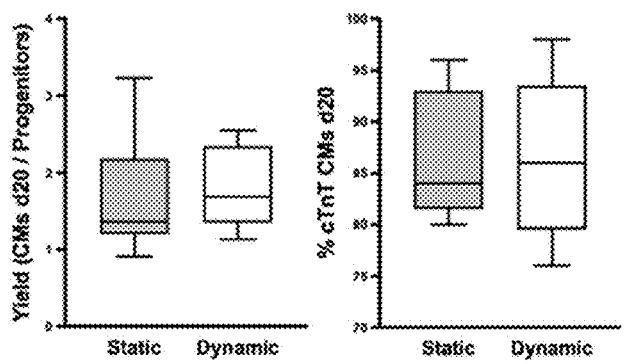

An important goal in cardiovascular regenerative medicine is to develop cell-based therapies to remuscularize the patient's heart following a myocardial infarction (a heart attack). The present invention provides methods of generating mature cardiomyocytes, such as mature ventricular cardiomyocytes. These methods generate cardiomyocyte cell populations enriched for mature cardiomyocytes. In some embodiments, more than 50% (e.g., more than 55%, more than 60%, more than 65%, more than 70%, more than 75%, more than 80%, more than 85%, more than 90%, more than 95%, or more than 99%) of the cardiomyocytes in the cell population are mature cells.

The enriched populations of mature cardiomyocytes provided herein are expected to be more efficacious in regenerative medicine for repairing damaged or underdeveloped heart tissue. These cells will engraft an infarcted heart more efficiently, integrate with the host myocardium more rapidly, improve ventricular wall thickening, and/or improve ejection fraction as compared to pharmaceutical compositions containing higher percentages of immature cardiomyocytes. The present mature cardiomyocytes cells also will replicate specific disease states in vitro better than immature cardiomyocytes and provide an improved tool for research and drug discovery. Compared to current therapies (including those in clinical and pre-clinical development), cell therapies using the present enriched cell populations will induce fewer ventricular arrhythmias.

Generation of Cardiomyocytes In Vitro

Cardiomyocytes are cells characterized by the expression of one or more of cardiac troponins (e.g., cardiac troponin I or cardiac troponin T ("cTNT" or "cTnT")). For cardiac regenerative cell therapy, ventricular cardiomyocytes are particularly useful. In some embodiments of the present disclosure, the mature cardiomyocytes are mature ventricular cardiomyocytes developed from ventricular cardiomyocyte progenitor cells.

Developmentally, cardiomyocyte progenitor cells or cardiac progenitor cells are derived from cardiac mesodermal cells, and are characterized by being cTNT$^+$NKX2-5$^+$. Ventricular cardiomyocyte progenitor cells are cells that are further along the developmental path to become ventricular cardiomyocytes, relative to mesodermal cells and other types of cardiomyocyte progenitor cells. Ventricular cardiomyocytes are cardiomyocytes having ventricular properties, including expression of ventricular-specific markers such as myosin light chain 2v (MLC2V), myosin light chain 2 (MYL2), Iroquois homeobox protein 4 (IRX4), and NK2 homeobox 5 (NKX2-5), and/or displaying electrophysical properties of a ventricular cell. In some embodiments, ventricular cardiomyocytes are characterized by being cTNT$^+$MLC2V$^+$. Ventricular cardiomyocytes include cells of the compact lineage and cells of the trabecular lineage.

A variety of cell types may be used as a source of cells for the in vitro (including ex vivo) generation of cardiomyocytes such as ventricular cardiomyocytes. The source cells may be, for example, pluripotent stem cells (PSCs). In other embodiments, the source cells may be mesodermal cells or cardiac stem cells. As used herein, the term "pluripotent" or "pluripotency" refers to the capacity of a cell to self-renew and to differentiate into cells of any of the three germ layers: endoderm, mesoderm, or ectoderm. "Pluripotent stem cells" or "PSCs" include, for example, embryonic stem cells, PSCs derived by somatic cell nuclear transfer, and induced PSCs (iPSCs). As used herein, the term "embryonic stem cells," "ES cells," or "ESCs" refers to pluripotent stem cells obtained from early embryos; in some embodiments, this term refers to ES cells obtained from a previously established ES cell line and excludes stem cells obtained by recent destruction of a human embryo.

One convenient source of cells for generating cardiomyocytes such as ventricular cardiomyocytes is iPSCs. iPSCs are a type of pluripotent stem cell artificially generated from a non-pluripotent cell, such as an adult somatic cell or a partially differentiated cell or terminally differentiated cell (e.g., a fibroblast, a cell of hematopoietic lineage, a myocyte, a neuron, an epidermal cell, or the like), by introducing to the cell or contacting the cell with one or more reprogramming factors. Methods of producing iPSCs are known in the art and include, for example, inducing expression of one or more genes (e.g., POU5F1/OCT4 (Gene ID: 5460) in combination with, but not restricted to, SOX2 (Gene ID: 6657), KLF4 (Gene ID: 9314), c-MYC (Gene ID: 4609, NANOG (Gene ID: 79923), and/or LIN28/LIN28A (Gene ID: 79727)). Reprogramming factors may be delivered by various means (e.g., viral, non-viral, RNA, DNA, or protein delivery); alternatively, endogenous genes may be activated by using, e.g., CRISPR and other gene editing tools, to reprogram non-pluripotent cells into PSCs.

Methods of isolating and maintaining PSCs, including ESCs and iPSCs, are well known in the art. See, e.g., Thomson et al., *Science* (1998) 282(5391):1145-7; Hovatta et al., *Human Reprod.* (2003) 18(7):1404-09; Ludwig et al., *Nat Methods* (2006) 3:637-46; Kennedy et al., *Blood* (2007) 109:2679-87; Chen et al., *Nat Methods* (2011) 8:424-9; and Wang et al., *Stem Cell Res.* (2013) 11(3):1103-16.

Methods for inducing differentiation of PSCs into cells of various lineages are well known in the art. For example, numerous methods exist for differentiating PSCs into cardiomyocytes, as shown in, e.g., Kattman et al., *Cell Stem Cell* (2011) 8(2):228-40; Burridge et al., *Nat Protocols* (2014) 11(8):855-60; Burridge et al., *PLoS ONE* (2011) 6:e18293; Lian et al., *PNAS*. (2012) 109:e1848-57; Ma et al., *Am J Physiol Heart Circ Physiol*. (2011) 301(5):H2006-H2017; WO 2016/131137; WO 2018/098597; and U.S. Pat. No. 9,453,201. See also Lee et al., *Cell Stem Cell* (2017) 21:179-94, which describes methods for differentiating human ESCs and human iPSCs into ventricular cardiomyocytes.

One method for generating human cardiac progenitors from hPSCs (e.g., hESCs and human iPSCs) involves (i) inducing hPSCS to differentiate into mesoderm by contacting the PSCs with a medium comprising an activator of the Activin signaling pathway (e.g., an Activin) and an activator of a bone morphogenetic protein 4 (BMP4) receptor (e.g., BMP4); and (ii) inducing the mesoderm to differentiate into cardiac progenitors by contacting the mesodermal cells with a Wnt signaling antagonist.

Activins are members of the transforming growth factor beta (TGF-β) family of proteins produced by many cell types throughout development. Activin A is a disulfide-linked homodimer (two beta-A chains) that binds to heteromeric complexes of a type I (Act RI-A and Act RI-B) and a type II (Act RII-A and Act MI-B) serine-threonine kinase receptor. Activins primarily signal through SMAD2/3 proteins when the activated activin receptor complex phosphorylates the receptor-associated SMAD. The resulting SMAD complex regulates a variety of functions, including cell proliferation and differentiation.

BMPs are part of the transforming growth factor beta superfamily. BMP4 binds to two different types of serine-threonine kinase receptors known as BMPR1 and BMPR2. Signal transduction via these receptors occurs via SMAD and MAP kinase pathways to effect transcription of BMP4's target genes. Various BMPs are suitable for use in generating the cells provided herein, including BMP4 and BMP2.

Wnt signaling antagonists are molecules (e.g., a chemical compound; a nucleic acid, e.g., a non-coding RNA; a polypeptide; and a nucleic acid encoding a polypeptide) that antagonize the Wnt signaling pathway, thus resulting in decreased pathway output (i.e., decreased target gene expression). For example, a Wnt signaling antagonist can function by destabilizing, decreasing the expression of, or inhibiting the function of a positive regulatory component of the pathway, or by stabilizing, enhancing the expression or function of a negative regulatory component of the pathway. Thus, a Wnt signaling antagonist can be a nucleic acid encoding one or more negative regulatory components of the pathway. A Wnt signaling antagonist can also be a small molecule or nucleic acid that stabilizes a negative regulatory component of the pathway at either the mRNA or the protein level. Likewise, a subject Wnt signaling antagonist can be a small molecule or nucleic acid inhibitor (e.g., microRNA, shRNA, etc.) of a positive regulatory component of the pathway that inhibits the component at the mRNA or protein level. In some embodiments, the Wnt signaling antagonist is a small molecule chemical compound (e.g., Xav-939, C59, ICG-001, IWR1, IWP2, IWP4, pyrvinium, PKF115-584, and the like).

For example, to generate cardiac progenitor cells, the PSCs may first be induced to aggregate to form embryoid bodies (EBs). The EBs may then be cultured in a first differentiation medium comprising Activin A, BMP4, and optionally fibroblast growth factor-basic (bFGF; also known as basic FGF, FGF-basic, FGF-beta, FGF2, heparin binding growth factor, or FGF family members bind heparin). The selection of Activin A, BMP4, and bFGF concentrations may be based on identification of a mesoderm population that contains a high proportion of CD235a$^+$ cells, no ALDH$^+$ cells and generates a high proportion of cTNT$^+$MLC2V$^+$ at day 20. In some embodiments, the concentration of BMP4 in the differentiation media is between about 1 and 30 ng/ml (e.g., about 5-10 or 5-15 ng/ml; or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 ng/ml). In some embodiments, the differentiation media includes Activin A at a concentration of about 1 and 30 ng/ml (e.g., about 5-10 or 5-15 ng/ml; or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 ng/ml). In some embodiments, the differentiation medium additionally contains 1-30 ng/ml bFGF (e.g., about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 ng/ml). In particular embodiments, the first differentiation medium contains about 10 ng/ml BMP4, about 6 ng/ml Activin A, and about 5 ng/ml bFGF. The hPSCs may be cultured in the first differentiation for about 1-3 days (e.g., 1, 1.5, 2, 2.5, or 3 days). After this culturing step, the cells may be further cultured for at least 1-3 days (e.g., 1, 1.5, 2, 2.5, or 3 days) in a second differentiation medium, which is a cardiac induction medium, comprising a Wnt signaling antagonist, such as IWP2, and optionally comprising VEGF. In some embodiments, the second differentiation medium may contain IWP2 at 1-10 μM such as 1, 2, 3, 4, 5, 6, 7, 8, 9, or 10 μM. In some embodiments, the second differentiation medium contains VEGF at a concentration of about 1 and 30 ng/ml (e.g., about 5-10 or 5-15 ng/ml; or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 ng/ml). In some embodiments, the EBs are induced to differentiate into cardiac progenitor cells (and eventually cardiomyocytes) in an EB differentiation media, commonly known as EB20 (see, e.g., Lee et al., *Circ Res*. (2012) 110(12):1556-63).

An alternative method for generating human cardiac progenitors from hPSCs (e.g., hESCs and human iPSCs) involves (i) activating Wnt/β-catenin signaling in hPSCs to obtain a first cell population; and (ii) inhibiting Wnt/β-catenin signaling in the first cell population to obtain a second cell population comprising cardiomyocyte progenitors. In some embodiments, small molecules may be used to sequentially activate and inhibit Wnt/β-catenin signaling. Activation of Wnt/β-catenin signaling in hPSCs may be achieved by contacting the hPSCs with a Wnt signaling agonist. In some embodiments, a Wnt signaling agonist functions by stabilizing β-catenin, thus allowing nuclear levels of β-catenin to rise. β-catenin can be stabilized in multiple ways. As multiple negative regulatory components of the Wnt signaling pathway function by facilitating the degradation of β-catenin, a subject Wnt signaling agonist can be a small molecule or nucleic acid inhibitor (e.g., microRNA, shRNA, etc.) of a negative regulatory component of the pathway that inhibits the component at the mRNA or protein level. For example, the Wnt signaling agonist is an inhibitor of glycogen synthase kinase-3 β (GSK-3β). In some such embodiments, the inhibitor of GSK-3β is a small molecule chemical compound (e.g., CHIR-99021, TWS119, BIO, SB 216763, SB 415286, CHIR-98014, and the like). Inhibition of Wnt/β-catenin signaling may be achieved by contacting the cells that were previously contacted with the Wnt signaling agonist, with a Wnt signaling antagonist, such as those described above. In general, after ending the inhibition of Wnt/β-catenin signaling, cardiac progenitors may be further cultured in a base cardiac medium, such as an RPMI base medium, a DMEM base medium, or StemPro-34, to obtain a cell population comprising human cardiomyocytes (e.g., human cardiac troponinT (cTnT)-positive cells).

In an exemplary, nonlimiting protocol based on the protocol described in Lian et al., supra, cardiomyocytes (including ventricular progenitor cells) may be generated from human PSCs via cardiac induction using CHIR as follows. At day −1, 6E6 hPSCs may be plated and cultured on Vitronectin-coated six-well plates in E8 medium and allowed to attach to the plates overnight. At day 0, cell culture medium may be prepared by adding CHIR (Tocris 4423/10) to basal cardiomyocyte (CM) medium (RPMI (with L-Glutamine)/B-27 without insulin, plus 213 µg/ml L-ascorbic acid 2-phosphate (Sigma)) to reach a CHIR concentration of 2, 4, 6, 8, 10, or 12 µM. The old medium in the plates may be replaced with 4 ml per well of CHIR-supplemented basal CM medium. Optimization of CHIR concentration may be desirable (e.g., a range of 2-12 µM CHIR may be tested). At day 1, the culture medium may be removed by aspiration. The wells may be washed once with DMEM to remove debris. Then room-temperature RPMI/B-27/without insulin medium may be added at a volume of 4 ml per well. The plates may be incubated at 37° C., 5% $CO_2$. At days 2 to 3, the culture medium may be removed by aspiration. The wells may be washed once with DMEM to remove debris. Then IWR1 may be added to 4 ml of fresh RPMI/B-27/without insulin medium, to reach a final IWR1 concentration of 2.5 µM. At day 5, the culture medium may be replaced with room-temperature RPMI/B-27/without insulin medium at a volume of 4 ml per well. The plates may be incubated at 37° C., 5% $CO_2$. At days 5, 6, 7, the cell culture comprises cardiac progenitor cells. At days 5, 6, 7, the cell culture comprises cardiac progenitor cells. From day 7 and on, the culture medium may be replaced with room-temperature RPMI/B-27 medium at a volume of 4 ml per well to generate cardiomyocytes. The plates may be incubated at 37° C., 5% $CO_2$. Cardiomyocytes may be counted by flow cytometry (cTNT/NKX2-5). Robust spontaneous contraction should occur by day 12. The cells can be maintained with this spontaneously beating phenotype for more than 6 months. This protocol may be scaled up to produce large quantities of cardiac progenitors and/or cardiomyocytes. For example, bioreactors, large roller bottles, and other culturing devices may be used in lieu of multi-well tissue culture plates.

See also Example 1 below for exemplary, nonlimiting cardiac differentiation protocols that may be used herein.

Promotion of Cardiomyocyte Maturation

The present inventors have discovered that cardiac progenitor cells or immature cardiomyocytes cultured on a soft, biocompatible substrate can develop into more mature cardiomyocytes as compared to cardiac progenitor cells cultured on a hard (e.g., stiff) substrate. A soft substrate may have hardness less than 50 D (e.g., less than 45, 40, 35, 30, 25, 20, 15, or 10 D) in durometer scale. Mature cells represent ideal target cells for cell-based therapy and disease modeling. Compared to immature cardiomyocytes, mature cardiomyocytes, such as mature ventricular cardiomyocytes, are characterized by larger cell size, more rod-like shape, increased multinucleation, increased sarcomere length, more organized sarcomere structures, increased expression of cardiac maturation markers (e.g., Cx43, MYH7, MYH6, TNNI3, TNNI1, MYL2, MYL7, S100A1, CASQ2, PLB, SCNA5, COX6A2, and CKM), and/or more mature electrophysiological properties (e.g., increased conduction velocity, slower spontaneous beating rate, enhanced calcium transient amplitude, more negative resting membrane potential, and/or faster action potential upstrokes). Immature ventricular cardiomyocytes, while displaying expression of ventricular markers such as MLC2V, lack some or all of these maturation markers and/or mature electrophysiological properties. As used herein, the difference between mature and immature cardiomyocytes with respect to each feature (e.g., biomarker expression level or electrophysiological parameter) may be more than 2%, 5%, 10%, 25%, 50%, 75%, 100%, 2 fold, 5 fold, or 10 fold.

The soft, biocompatible substrate is non-toxic and may be elastic or flexible, gas-permeable, and/or inert. The substrate may be, for example, a synthetic or natural polymer and may include silicone (e.g., PDMS), plastics, rubbers, and soft ceramics. See also Maitz, *Biosurface Biotrib.* (2015) 1:161-76. The softness or hardness of a substrate may be indicated in units of pascal (Pa) or Durometer (D), and may be measured by any known method in the art such as the nanoindentation technique. The substrate may take the form of, for example, membrane or film, layers of membrane or film, matrices, or beads. In some embodiments, the substrate is silicone membrane (e.g., PDMS membrane). PDMS is a mineral-organic silicon-based polymer of the siloxane family. In some embodiments, PDMS membrane with thickness of 100-400 µM and hardness of 10-50 D may be used. Thickness may be selected based on the desired manipulativeness of the membrane for a particular tissue culture system.

The substrate may be coated with extracellular matrix (ECM) proteins such as basement membrane matrix proteins. By way of example, the substrate may be coated with Matrigel® extracellular matrix (Corning Life Sciences), Cultrex® BME (Trevigen), Geltrex™ Matrix (Thermo Fisher Scientific), fibronectin, collagen IV, laminins, vitronectin, poly-1-dopamine, and/or native ECMs (e.g., derived from porcine heart tissue). In some embodiments, the ECM proteins are extracted from non-human cells such as rodent (mouse) or bovine cells. In some embodiments, the substrate is coated with Matrigel® extracellular matrix (a gelatinous protein mixture secreted by Engelbreth-Holm-Swarm (EHS) mouse sarcoma cells) or an equivalent material (e.g., Cultrex® BME and Geltrex™ Matrix).

To promote the maturation of the in vitro derived cardiomyocytes, the cells are seeded on the soft, biocompatible substrate and may be cultured in a cardiac base medium, such as an RPMI base medium, a DMEM base medium, or StemPro-34. Optionally, the cardiac base medium may comprise VEGF at a concentration of about 1 and 30 ng/ml (e.g., about 5-10 or 5-15 ng/ml; or about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 ng/ml) for at least 1-7 days (e.g., 1, 2, 3, 4, 5, 6, or 7 days).

The cells (e.g., ventricular cardiomyocyte progenitor cells or immature ventricular cardiomyocytes) on the soft, biocompatible substrate may be cultured in a dynamic, rather than static, manner. Examples of dynamic culture environments include roller bottles, rocking or wave culture devices, and stirred tank bioreactors. For example, the soft, biocompatible substrate may be a sheet or membrane that is inserted into a roller bottle and positioned to line the inner surface of the bottle, which may then be seeded with cardiac progenitor cells and rotated gently by a motorized tube roller. Alternatively, the substrate may be used to line a cell culture bag and the bag is gently rocked or swirled during the culturing. The combined use of a soft, biocompatible substrate and motion may promote maturation of the cultured cells. The use of these culturing devices also allows for large scale production of mature cardiomyocytes; for example, the culture volume may be more than 100 mL, e.g., at or more than 200 mL, 250 mL, 500 mL, 1 L, 5 L, 10 L, 20 L, 50 L, 100 L, 200 L, 250 L, or 500 L.

Pharmaceutical Compositions and Use

The enriched populations of mature cardiomyocytes of the present disclosure can be used in cell therapy to treat a subject (e.g., a human subject) with cardiomyopathy or at risk of having cardiomyopathy. Cardiomyopathy is a group of conditions including, without limitation, ischemic heart disease, myocardial infarction (acute and chronic), left ventricular heart failure, right ventricular heart failure, myocarditis (e.g., myocarditis caused by bacterial or viral infection), dilated cardiomyopathy, and congenital heart disease. In some embodiments, the subject is suffering from one or more previous myocardial infarctions. In further embodiments, the one or more myocardial infarctions are in the ventricle (e.g., left ventricle) of the subject. The cell therapy provided herein results in repair of cardiac muscle and restoration of cardiac function in the subject, thus treating the cardiomyopathy.

The present cell preparations can treat cardiomyopathy by: (1) repopulating diseased (e.g., scarred) myocardium with contractile myocytes; (2) providing a scaffolding to diminish further abnormal remodeling of the thinned, injured ventricle; and/or (3) serving as a vehicle for the release of salutary paracrine factors such as pro-angiogenic, cardioprotective, matrix-remodeling or anti-inflammatory signals. Due to the improved purity of the present cell preparations, the present cell therapy will result in fewer side effects, including less frequent ventricular arrhythmias as compared to prior cell therapy.

The cell preparations of the present disclosure may be administered via minimally invasive methods and/or transplanted locally into a subject in need thereof. Various methods are known in the art for administering cells into a patient's heart, for example, intracoronary administration, intramyocardial administration, or transendocardial administration.

The enriched cell populations described herein may be provided in a pharmaceutical composition containing the cells and a pharmaceutically acceptable carrier. In some embodiments, the pharmaceutical composition comprises a population of PSC-derived mature ventricular cardiomyocytes as described herein and a pharmaceutically acceptable carrier and/or additives. In some embodiments, the pharmaceutical composition comprises a population of iPSC-derived mature ventricular cardiomyocytes as described herein and a pharmaceutically acceptable carrier and/or additives. For example, sterilized water, physiological saline, general buffers (e.g., phosphoric acid, citric acid, and other organic acids), stabilizers, salts, anti-oxidants, surfactants, suspensions, isotonic agents, cell culture medium that optionally does not contain any animal-derived component, and/or preservatives may be included in the pharmaceutical composition. In some embodiments, the pharmaceutical composition is formulated into a dosage form suitable for administration to a subject in need of treatment. In some embodiments, the pharmaceutical composition is formulated into a dosage form suitable for intramyocardial administration, transendocardial administration, or intracoronary administration. For storage and transportation, the cells optionally may be cryopreserved. Prior to use, the cells may be thawed and diluted in a sterile carrier that is supportive of the cell type of interest.

A therapeutically effective number of mature cardiomyocytes such as mature ventricular cardiomyocytes are administered to the patient. As used herein, the term "therapeutically effective" refers to a number of cells or amount of pharmaceutical composition that is sufficient, when administered to a human subject suffering from or susceptible to a disease, disorder, and/or condition, to treat, prevent, and/or delay the onset or progression of the symptom(s) of the disease, disorder, and/or condition. It will be appreciated by those of ordinary skill in the art that a therapeutically effective amount is typically administered via a dosing regimen comprising at least one unit dose.

Unless otherwise defined herein, scientific and technical terms used in connection with the present disclosure shall have the meanings that are commonly understood by those of ordinary skill in the art. Exemplary methods and materials are described below, although methods and materials similar or equivalent to those described herein can also be used in the practice or testing of the present disclosure. In case of conflict, the present specification, including definitions, will control. Generally, nomenclature used in connection with, and techniques of, cardiology, medicine, medicinal and pharmaceutical chemistry, and cell biology described herein are those well-known and commonly used in the art. Enzymatic reactions and purification techniques are performed according to manufacturer's specifications, as commonly accomplished in the art or as described herein. Further, unless otherwise required by context, singular terms shall include pluralities and plural terms shall include the singular. Throughout this specification and embodiments, the words "have" and "comprise," or variations such as "has," "having," "comprises," or "comprising," will be understood to imply the inclusion of a stated integer or group of integers but not the exclusion of any other integer or group of integers. All publications and other references mentioned herein are incorporated by reference in their entirety. Although a number of documents are cited herein, this citation does not constitute an admission that any of these documents forms part of the common general knowledge in the art.

As used herein, the term "approximately" or "about" as applied to one or more values of interest refers to a value that is similar to a stated reference value. In certain embodiments, the term refers to a range of values that fall within 10%, 9%, 8%, 7%, 6%, 5%, 4%, 3%, 2%, 1%, or less in either direction (greater than or less than) of the stated reference value unless otherwise stated or otherwise evident from the context.

In order that this invention may be better understood, the following examples are set forth. These examples are for purposes of illustration only and are not to be construed as limiting the scope of the invention in any manner.

Exemplary Embodiments

Exemplary, nonlimiting embodiments of the present invention are described below.

1. A method of generating a cell population enriched for mature cardiomyocytes, comprising:

(a) providing a human cardiac progenitor cell,
(b) seeding the human cardiac progenitor cell on a soft, biocompatible substrate, and
(c) culturing the seeded cell in a cardiac base medium inside a tissue culture container for four or more days under conditions that allow development of the seeded cell into mature cardiomyocytes, thereby producing a cell population enriched for mature cardiomyocytes.

2. A method of generating a cell population enriched for mature cardiomyocytes, comprising:
   (a) providing a human cardiac progenitor cell or an immature human cardiomyocyte,
   (b) seeding the human cell on a soft, biocompatible substrate, and
   (c) culturing the seeded cell in a cardiac base medium inside a tissue culture container for four or more days under conditions that allow development of the seeded cell into mature cardiomyocytes, wherein the cardiac base medium is induced to move during the culturing,
   thereby producing a cell population enriched for mature cardiomyocytes.

3. The method of embodiment 1 or 2, wherein the human cardiac progenitor cell or immature human cardiomyocyte is derived from a human pluripotent stem cell (hPSC).

4. The method of embodiment 3, wherein the hPSC is a human embryonic stem cell.

5. The method of embodiment 3, wherein the hPSC is a human induced pluripotent stem cell.

6. The method of any one of embodiments 3-5, wherein the human cardiac progenitor cell or immature cardiomyocyte is derived from the hPSC by
   (i) culturing the hPSC for about 1-3 days in the presence of an activator of a bone morphogenetic protein 4 (BMP4) receptor, a fibroblast growth factor (FGF), and an activator of the Activin signaling pathway, and
   (ii) culturing the cell(s) from step (i) in the presence of a Wnt signaling antagonist for about 1-3 or more days.

7. The method of embodiment 6, wherein the human cardiac progenitor cell or immature cardiomyocyte is derived from the hPSC by
   (i) culturing the hPSC in the presence of BMP4, basic FGF, and Activin A for about 1-3 days, and
   (ii) culturing the cell(s) from step (i) in the presence of IWP2 and optionally VEGF for about 1-3 or more days.

8. The method of any one of embodiments 3-5, wherein the human cardiac progenitor cell or immature cardiomyocyte is derived from the hPSC by
   (i) culturing the hPSC in the presence of one or more Wnt signaling agonists, and
   (ii) culturing the cell(s) from step (i) in the presence of one or more Wnt antagonists.

9. The method of any one of embodiments 1-8, further comprising
   (d) culturing the cell(s) from step (c) in the presence of insulin for about one to four weeks.

10. The method of any one of embodiments 1-9, wherein the soft, biocompatible substrate is silicone.

11. The method of embodiment 10, wherein the soft, biocompatible substrate is polydimethylsiloxane (PDMS) membrane.

12. The method of any one of embodiments 1-11, wherein the substrate is coated with extracellular matrix proteins comprising one or more of laminins, collagens, heparin sulfate proteoglycans, fibronectin, vitronectin, and poly-1-dopamine.

13. The method of embodiment 1-11, wherein the substrate is coated with growth factor reduced Matrigel® extracellular matrix or an equivalent thereof.

14 The method of any one of embodiments 1 and 3-13, wherein step (c) and optionally step (d), when present, are performed with movement of the cardiac base medium.

15. The method of embodiment 2 or 14, wherein the substrate is alternately submerged in the cardiac base medium and exposed to air due to the movement.

16. The method of any one of embodiments 1-15, wherein the cardiac progenitor cell is a ventricular cardiomyocyte progenitor.

17. The method of any one of embodiments 1-16, wherein the mature cardiomyocytes are mature ventricular cardiomyocytes.

18. The method of any one of embodiments 1-17, wherein the culture volume in step (c) and step (d), when present, is about 100 mL to about 500 L.

19. A plurality of mature cardiomyocytes obtained by the method of any one of embodiments 1-18.

20. A pharmaceutical composition consisting of a cellular component and a carrier component, wherein the cellular component is a cell population in which more than 50% of the cells are mature cardiomyocytes, and wherein the carrier component comprises a pharmaceutically acceptably carrier, wherein the mature cardiomyocytes are characterized by, as compared to immature cardiomyocytes:
   i) increased expression of one or more of Cx43, N-cadherin, MYH7, MYH6, TNNI3, TNNI1, MYL2, MYL7, S100A1, CASQ2, PLB, SCNA5, COX6A2, and CKM; or
   ii) increased conduction velocity, slower spontaneous beating rate, and enhanced calcium transient amplitude.

21. A method of treating a cardiomyopathy condition in a subject in need thereof, comprising administering to the subject the plurality of cells of embodiment 19, or the pharmaceutical composition of embodiment 20.

22. The method of embodiment 21, wherein the cardiomyopathy is myocardial infarct.

EXAMPLES

Example 1: Maturation of hPSC-CMs on PDMS Membrane

This example describes a study where highly mature hPSC-CMs were produced in in vitro by re-plating differentiating hPSC-CM cultures on 2D PDMS membranes. The study was able to produce mature CMs on a scale of about $10^8$-$10^9$ per batch. We have also found that plating hPSC-CMs on PDMS membrane when the cells are still at an early, cardiac progenitor stage increases re-plating efficiency and yield of mature CMs. Compared to conventional hard substrates like tissue culture plastic (TCP) or glass, PDMS membrane is softer and gas-permeable. These properties may contribute to PDMS's promotion of CM maturation in the cell culture system.

The protocol for preparing PDMS substrates for hPSC-CM differentiation and maturation is depicted in FIG. 1, panel b. In brief, PDMS vulcanized silicone transparent sheeting was obtained from Specialty Manufacturing, Inc. (Saginaw, MI) with 40D (D, Durometer or ~1000 kPa) hardness. PDMS sheets were sterilized (130° C. for 15 minutes) and coated with various extracellular matrices (e.g., Matrigel® extracellular matrix) before cell seeding. We used 380 μm thickness PDMS sheets for roller bottles (thickness was selected for ease to insert the sheets into the bottles), and 126 μm thickness PDMS sheets for static plates. Both kinds of sheets had a hardness of about 40D.

We then employed these PDMS substrates in a modified version of a directed differentiation protocol previously reported by Lee, 2017, supra (FIG. 1, panel a). In brief, after reaching 85% confluence, hPSCs were dissociated and aggregated (day 1) for 24 hours in StemPro-34 media supplemented with L-Glutamine, ascorbic acid, MTG, transferrin and added with 10 ng/ml BMP4, 6 ng/ml Activin A, bFGF, and ROCK inhibitor (RI). Cells were then transferred to an IWP2-supplemented medium for 24 hours and treated with VEGF for 3 days (Cardiac Induction 2 Media). At day 6 of differentiation, the embryoid bodies were collected and dissociated to single cells, which were seeded on either regular tissue culture plastic plates (TCP) or TCPs lined with PDMS membrane, both pre-coated with growth factor reduced (GFR) Matrigel® extracellular matrix. They were fed with fresh media supplemented with ROCK (Rho-associated, coiled-coil containing protein kinase) inhibitor and VEGF (Cardiac Induction 3 Media). Both culture systems yielded hPSC-CM monolayers as demonstrated by Giemsa staining. Beating cells were observed after 10 to 13 days of in vitro differentiation. Once cell beating was observed, VEGF was withdrawn from the culture medium, e.g., by using RPMI 1640 medium with insulin-containing B-27 supplement (i.e., a base cardiac medium). RPMI+B27 medium was replaced every 2 to 3 days until day 20 or 40, at which time the cultures were dissociated to single cells, counted and cryopreserved for in vitro or transplantation studies. Panels c and d of FIG. 1 show that the roller bottle system appeared to provide a higher yield of CMs than the static culture system and yet is substantially more economical.

After a total of either 20 or 40 days of in vitro differentiation, the resultant hPSC-CM monolayers on regular TCP or PDMS-lined TCP were harvested for in vitro phenotyping and/or cryopreserved for transplantation studies.

Figure 2:
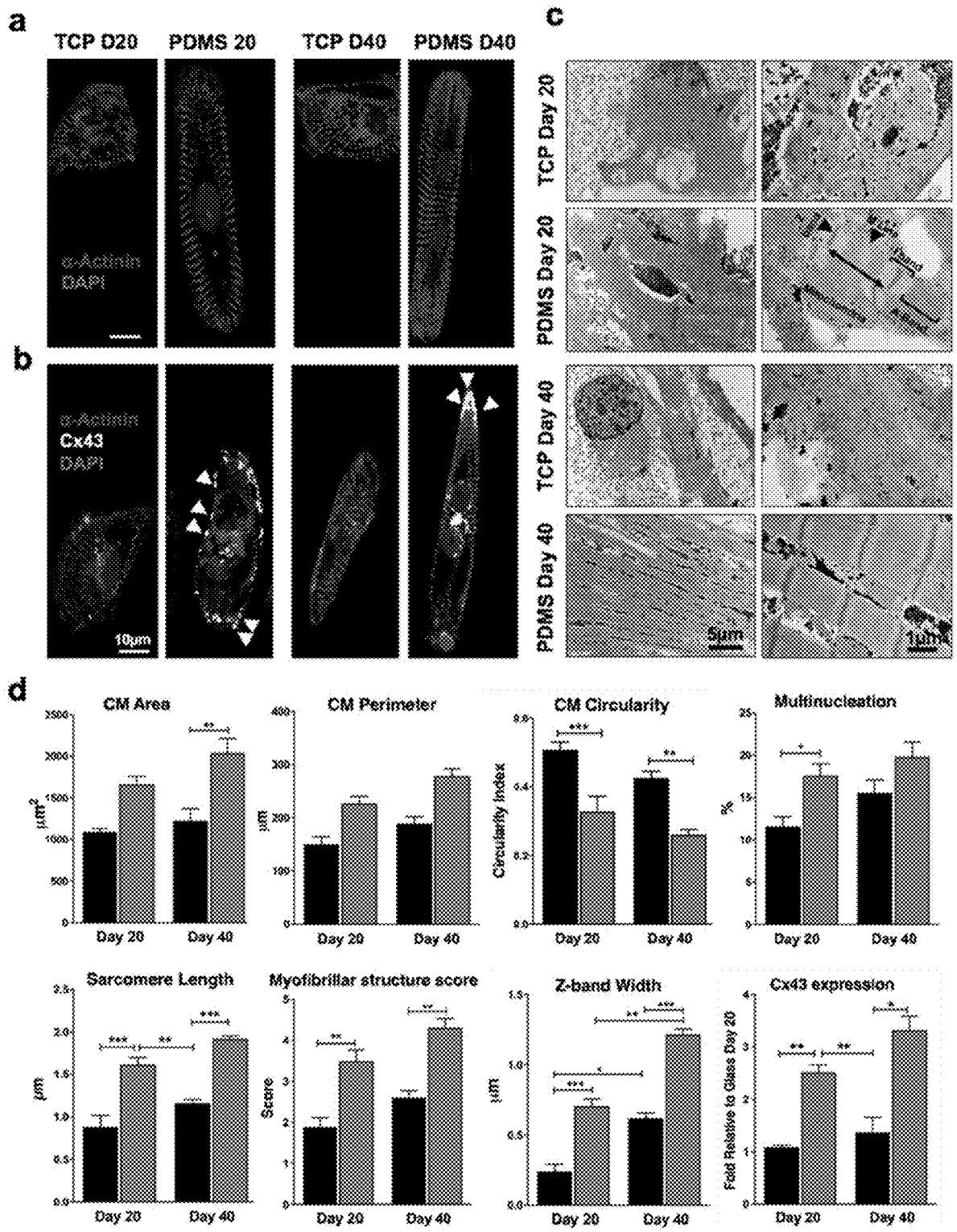
FIG. 2 shows that hPSC-CMs cultured on PDMS-lined tissue culture dishes have more mature morphological and structural phenotypes than their counterparts on tissue culture plastic (TCP; polystyrene) surface. Representative confocal immunofluorescence photomicrographs (panels a and b) and transmission electron microscopy (TEM) images (panel c) of hPSC-CM monolayers cultured on TCP or PDMS after either 20 or 40 days of in vitro differentiation. In panel c, mitochondria are indicated by red symbols. Panel d is a panel of graphs comparing the properties of CMs grown on TCP (left, darker color bar) and PDMS (right, lighter color bar). All data are presented as mean±SEM (n=4 to 6 biological replicates). *=P<0.05, =P<0.01, *=P<0.001 via post hoc Bonferonni's tests.
Figure 3:
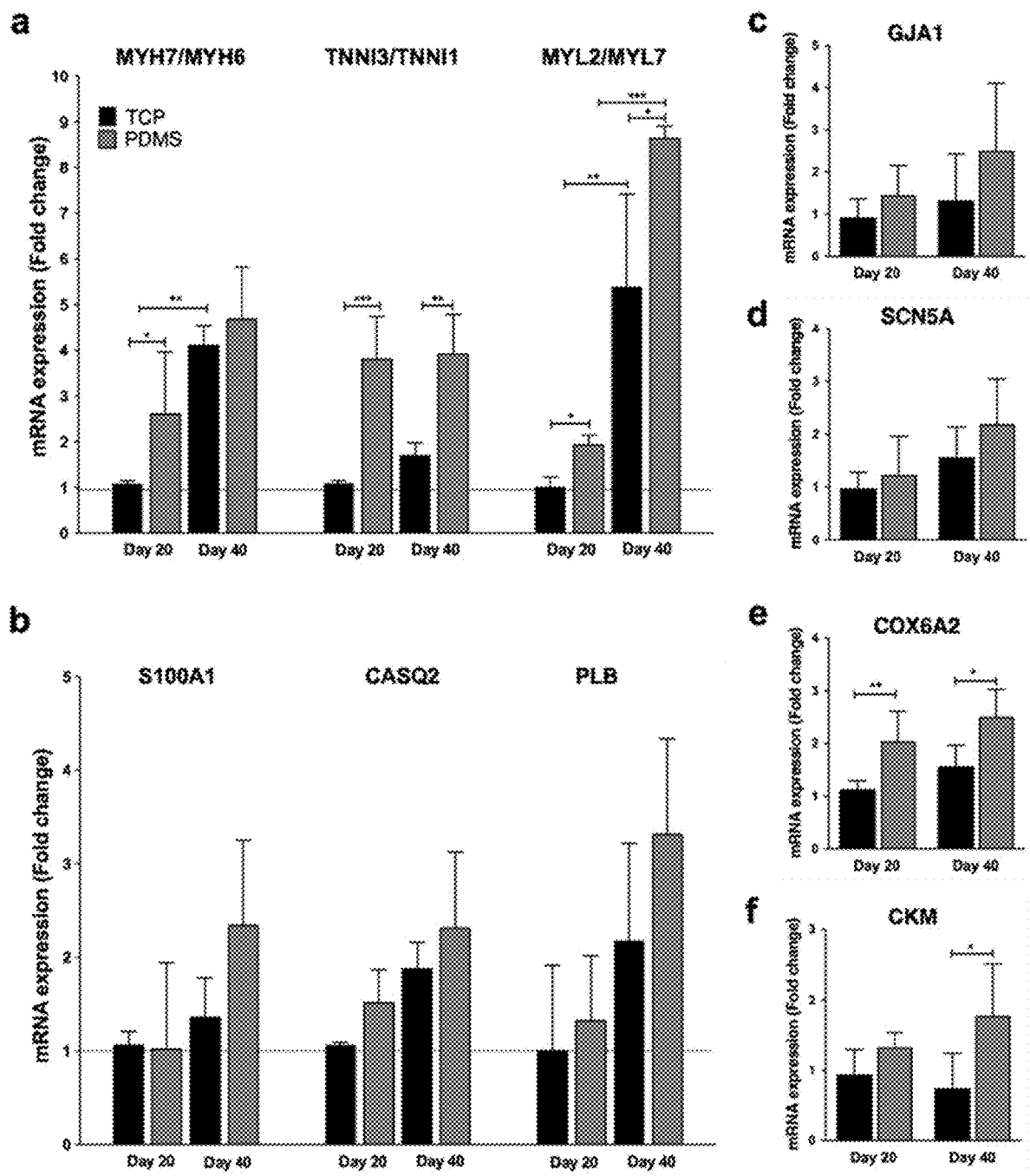
FIG. 3 shows that cardiomyocytes on PDMS exhibit enhanced expression of cardiac maturation markers. Panel a shows the relative expression of the sarcomeric markers (MYH7, MYH6, TNNI1, TNNI3, MYL2, and MYL7) at days 20 and 40 in hPSC-CMs cultured on TCP vs. PDMS. Panel b compares the expression of calcium handling effectors S100A1, CASQ2 and PLB). Panels c-f compare the expression of gap junction Cx43 (GJA1), fast sodium channel protein SCNA5, and critical metabolic genes COX6A2 and CKM, respectively. All data are presented as mean±SEM (n=4 to 6 biological replicates). *=P<0.05, =P<0.01, *=P<0.001.

Multiple in vitro analyses were performed after 20 or 40 days of in vitro differentiation and maturation on either PDMS membranes or stiff substrates like TCP. At both time-points, hPSC-CM cultures maintained on PDMS showed a substantially more mature cardiac phenotype than their counterparts on TCP, as evidenced by their structural properties (FIG. 2) or expression of key cardiac genes (FIG. 3). Compared to their counterparts cultured on TCP, cardiomyocytes on PDMS showed increased cellular area and perimeter, a more rod-like shape and reduced circularity index (better aligned), increased multinucleation, sarcomere length, myofibrillar structure score, Z-band width and connexin-43 (Cx43) expression (FIG. 2, panel d). By qRT-PCR, PDMS hPSC-CM cultures showed a more mature pattern of gene expression based on a panel including fetal and the adult myosin heavy chain isoforms (MYH7/MYH6), troponin isoforms (TNNI3/TNNI1), myosin light chain (MYL2/MYL7), calcium handling effectors (S100A1, CASQ2 and PLB), the predominant cardiac gap junction connexin-43 (GJA1), the fast sodium channel (SCN5A), and metabolic markers of maturation (COX6A2 and CKM) (FIG. 3).

Figure 4:
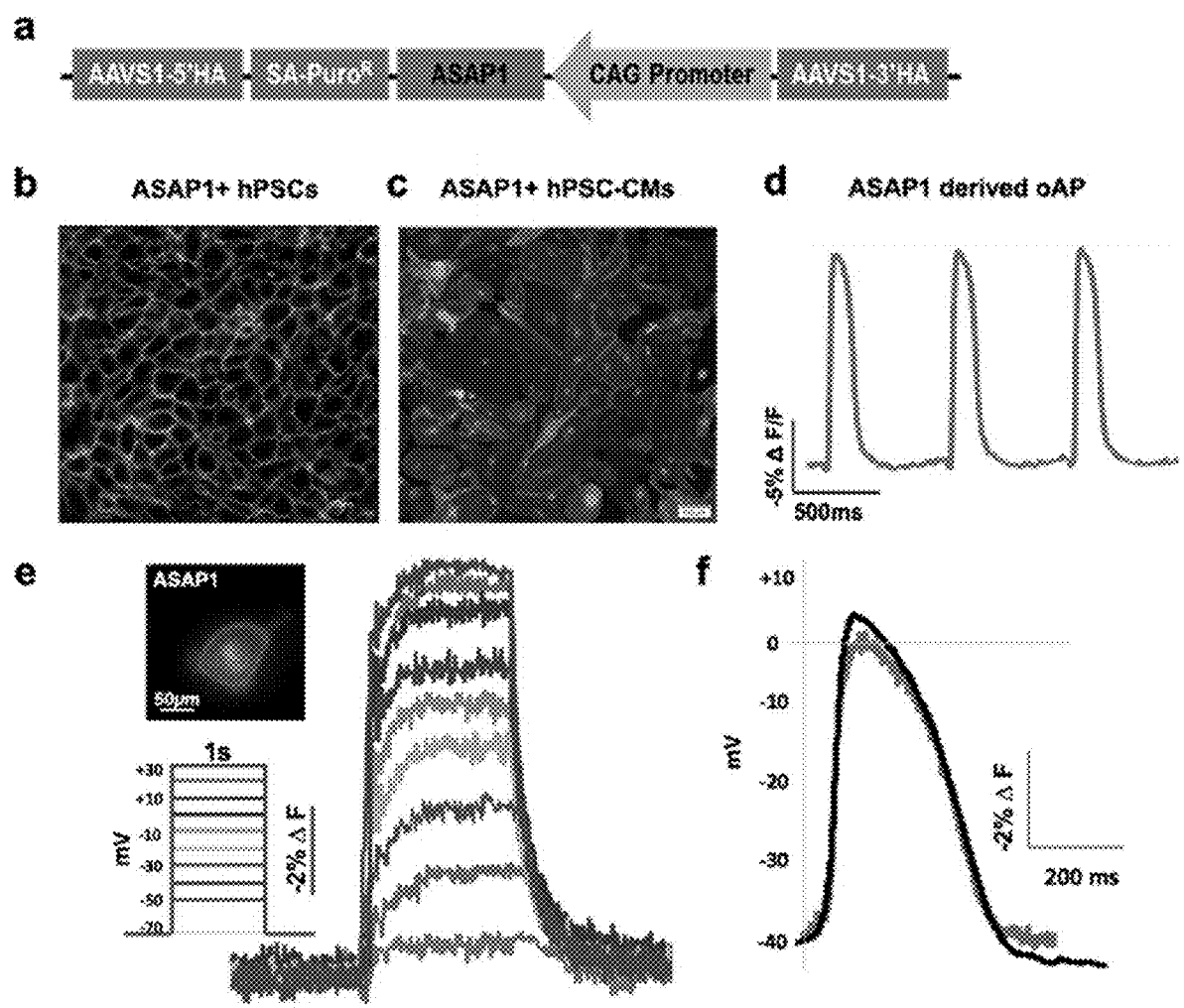
FIG. 4 shows generation and in vitro phenotype of ASAP1$^+$ hESC-CMs. Panel a is a schematic diagram of an ASAP1 expression cassette targeted to the AAVS1 safe harbor locus in hESCs via CRISPR/Cas9. Panels b and c are confocal photomicrographs of undifferentiated ASAP1$^+$ hESCs and differentiated CMs, respectively (Ex:488 nm, EM:525/50 nm). Panel d shows the representative optical action potentials (oAPs) from spontaneously beating ASAP1$^+$ hESC-CMs, with a peak amplitude (-%ΔF/F) of about 15% and APD90=280±30 ms. Panel e shows the fluorescence recordings from a representative ASAP1$^+$ hPSC-CM during concurrent voltage-clamp protocol. As indicated in the inset, the cell was subjected to test pulses from −70 mV to +30 mV in 20 mV increments from a holding potential of −60 mV, evoking the indicated fluorescent transients. Panel f shows the simultaneous ASAP1-derived oAP (green trace) and direct action potential recording obtained via simultaneous current-clamp (black trace).

To facilitate visualization of the electrical function of hPSC-CM in vitro and (later their in vivo function after transplantation into injured guinea pig hearts), we created transgenic hPSC lines that stably expressed the fluorescent voltage-sensitive protein ASAP1 (ArfGAP With SH3 Domain, Ankyrin Repeat And PH Domain 1) from the AAVAS1 safe harbor locus. The resultant ASAP1$^+$ hPSC-CMs exhibited robust optical action potentials than was detected using a high speed EM-CCD camera (details in FIG. 4).

Figure 5:
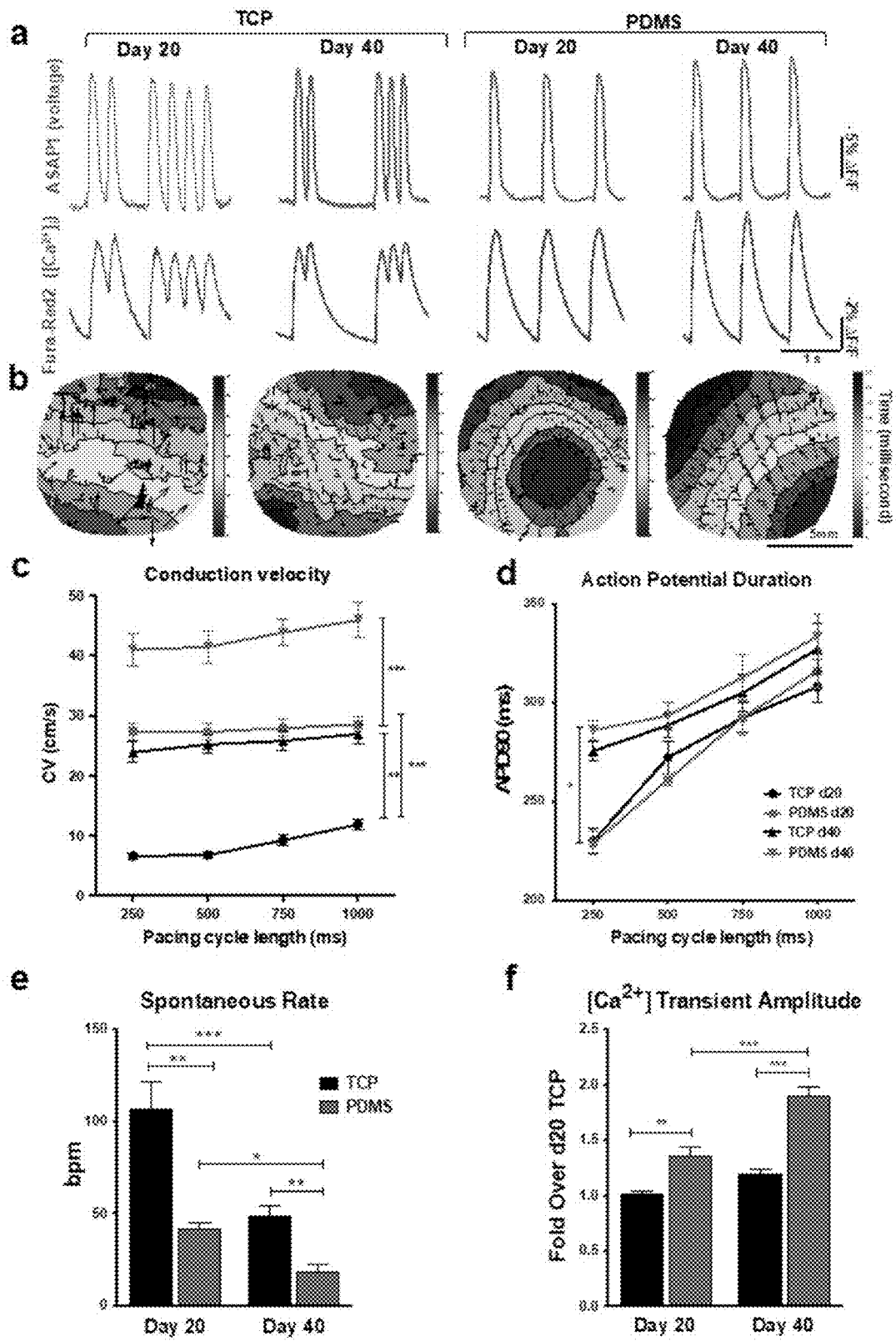
FIG. 5 shows that cardiomyocytes on PDMS exhibit more mature electrophysiological properties in vitro than their counterparts on TCP surface. ASAP1$^+$ hESC-CM monolayers formed on PDMS or TCP were loaded with Fura Red2 and imaged at day 20 and day 40 to compare their electrical and [Ca2+]i handling properties. ASAP1-derived oAPs (green) or Ca transients (FuraRed, red) were acquired under either spontaneous (panel a) or stimulated (not shown) conditions. Panels b-f show data for voltage activation maps), conduction velocity, spontaneous beating rate, action potential duration, and [Ca2+]i transient amplitude, respectively. All data are presented as mean±SEM (n=4 to 6 biological replicates). *=P<0.05, =P<0.01, *=P<0.001.

We used this system to compare the electrophysiological phenotype of ASAP1$^+$ hPSC-CMs. Compared to ASAP1$^+$ hPSC-CMs cultured as monolayers on TCP, ASAP1$^+$ hPSC-CMs cultured as monolayers on PDMS showed tighter and more regular oAP propagation (FIG. 5, panel b, voltage activation maps). The monolayers on PDMS achieved a higher degree of electrical maturity at day 40, as indicated by a more rapid conduction velocity, with average conduction velocities as high as 46 cm/s, compared to monolayers cultured on TCP with a CV of 28 cm/s at 1 Hz pacing frequency (FIG. 5, panel c). Although there was no significant difference in the action potential duration (APD$_{90}$, to 90% of repolarization), the beating rate of PDMS monolayers was significantly lower than their counterparts on TCP (FIG. 5, panels d and e). Calcium transient amplitude was significantly increased in PDMS cultures (FIG. 5, panel f), another measure of functional maturation.

Example 2: Improved Engraftment of Mature hPSC-CMs in Animal Models

Figure 6:
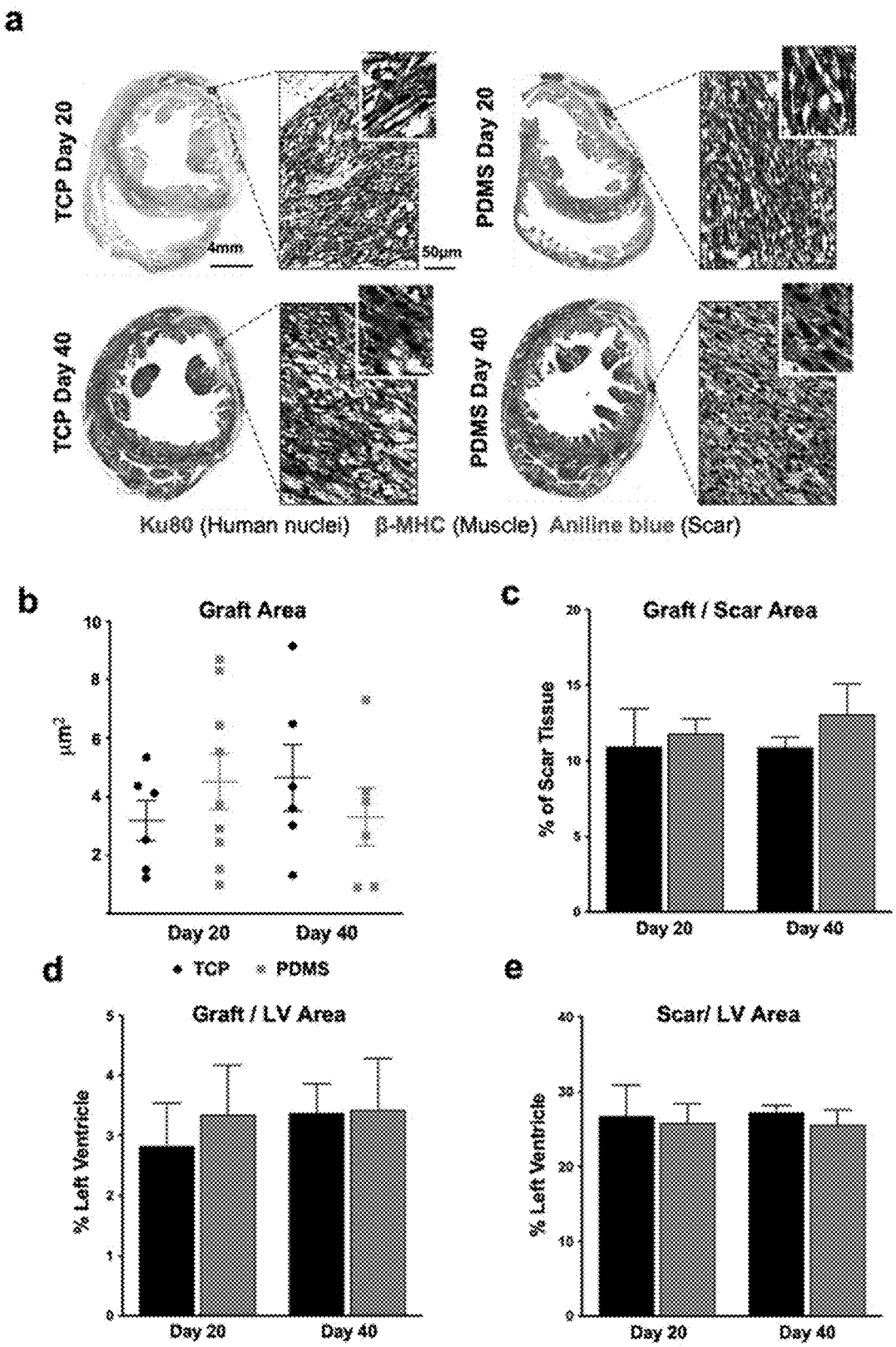
FIG. 6 shows that hPSC-CMs cultured on TCP and PDMS form comparably sized grafts after transplantation into injured guinea pig hearts. Injured guinea pig hearts received TCP- vs. PDMS-cultured hESC-CMs harvested after either 20 or 40 days of in vitro differentiation. The engrafted hearts were analyzed by histology at 14 days post transplantation. Panel a shows the low- and high-magnification views of representative hearts with graft myocardium formed using TCP-cultured or PDMS-cultured cardiomyocytes. Sections were immunostained for human Ku80 (brown nuclear marker) and β-myosin heavy chain (magenta cardiomyocytes) and counterstained with aniline blue (scar). Panels b-e compare graft size, ratio of graft/scar area, graft/LV area and scar/LV area, respectively, among the four groups. LV: left ventricle.

To test the capacity of PDMS-matured hPSC-CMs to form graft myocardium with enhanced structural and functional properties, we transplanted day 20 or 40 TCP vs. PDMS ASAP1$^+$ hPSC-CMs into cryoinjured guinea pig hearts (n=6 to 9 per group). Engrafted hearts were later analyzed by ex vivo optical voltage mapping studies and histology. The first endpoint was to compare the extent of engraftment by immunohistochemistry and histomorphometry. The graft area positive for Ku80 (a human-specific nuclei marker) correlated well with staining for β-myosin heavy chain (FIG. 6, panel a). FIG. 6 shows that there was no significant difference in the graft size (panel b) or in the ratio of graft/scar area (panel c), graft/LV area (panel d) or scar/LV area (panel e). These data indicate that CMs from both substrates at day 20 and at day 40 showed similar capacity for engraftment in terms of graft area and graft per scar or per left ventricle areas.

Figure 7:
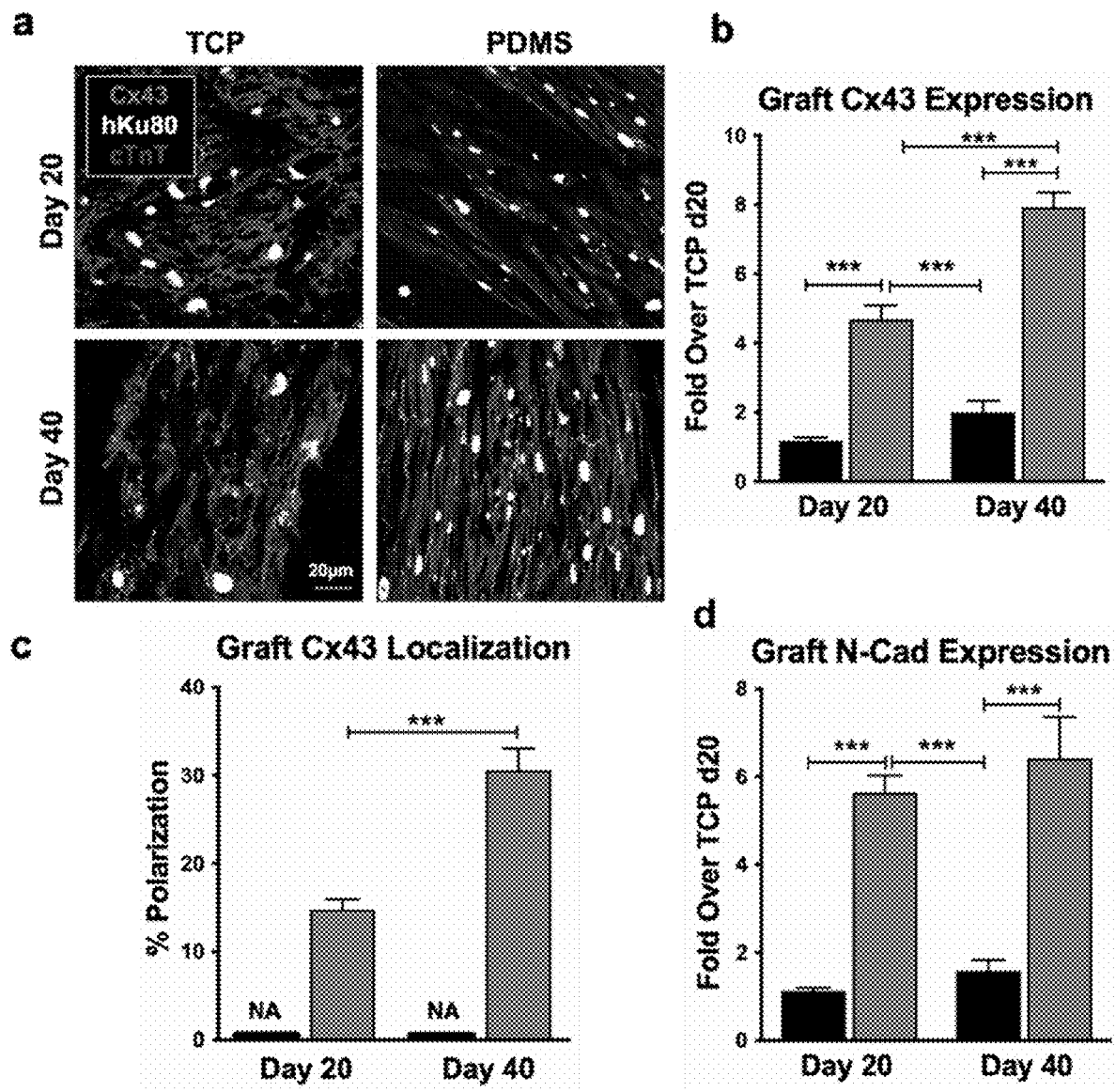
FIG. 7 shows that grafts in injured hearts formed with PDMS-cultured hPSC-CMs exhibit increased sarcomeric organization and enhanced Cx43 and N-cadherin expression and distribution relative to grafts formed with TCP-cultured myocytes. Panel a is a group of photographs of representative engrafted hearts showing graft cardiomyocytes immunostained for human Ku80 (white nuclei), cardiac troponin T (cTnT, red), and gap junction protein Cx43 (green) after transplantation of TCP-cultured or PDMS-cultured hESC-CMs harvested after either 20 or 40 days of in vitro differentiation. Panels b and c compare Cx43 expression and polarization, respectively, among the test cells. Panel d compares N-cadherin expression among the test cells. Black bars: TCP-cultured cells. Blue bars: PDMS-cultured cells. NA: not applicable. All data are presented as mean±SEM (n=6 to 9 engrafted hearts per group). ***=P<0.001.

However, graft myocardium formed with PDMS-matured CMs had substantially more mature histological and structural properties. The PDMS-matured CMs generated larger graft-derived CMs with higher myofibril alignment and sarcomeric organization. Those CMs developed gap junctions (Cx43) and had enhanced Cx43 and N-cadherin expression compared to TCP derived myocytes (FIG. 7, panels a, b, and d). Cx43 also showed increased anisotropy and localization to the short axis of myocytes in grafts formed with PDMS-cultured cells. Interestingly, we found that Cx43 show circumferential distribution in hPSC-CMs derived graft from PDMS day 20 culture although they polarize in the intercalated disks of the grafts from PDMS day 40 (FIG. 7, panels a and c). While the percentage of cells showing such polarization could not be quantitated in grafts formed with TCP hPSC-CMs, there was a significant increase in polarization between grafts formed with day 20 vs. day 40 PDMS hPSC-CMs (FIG. 7, panel c).

Figure 8:
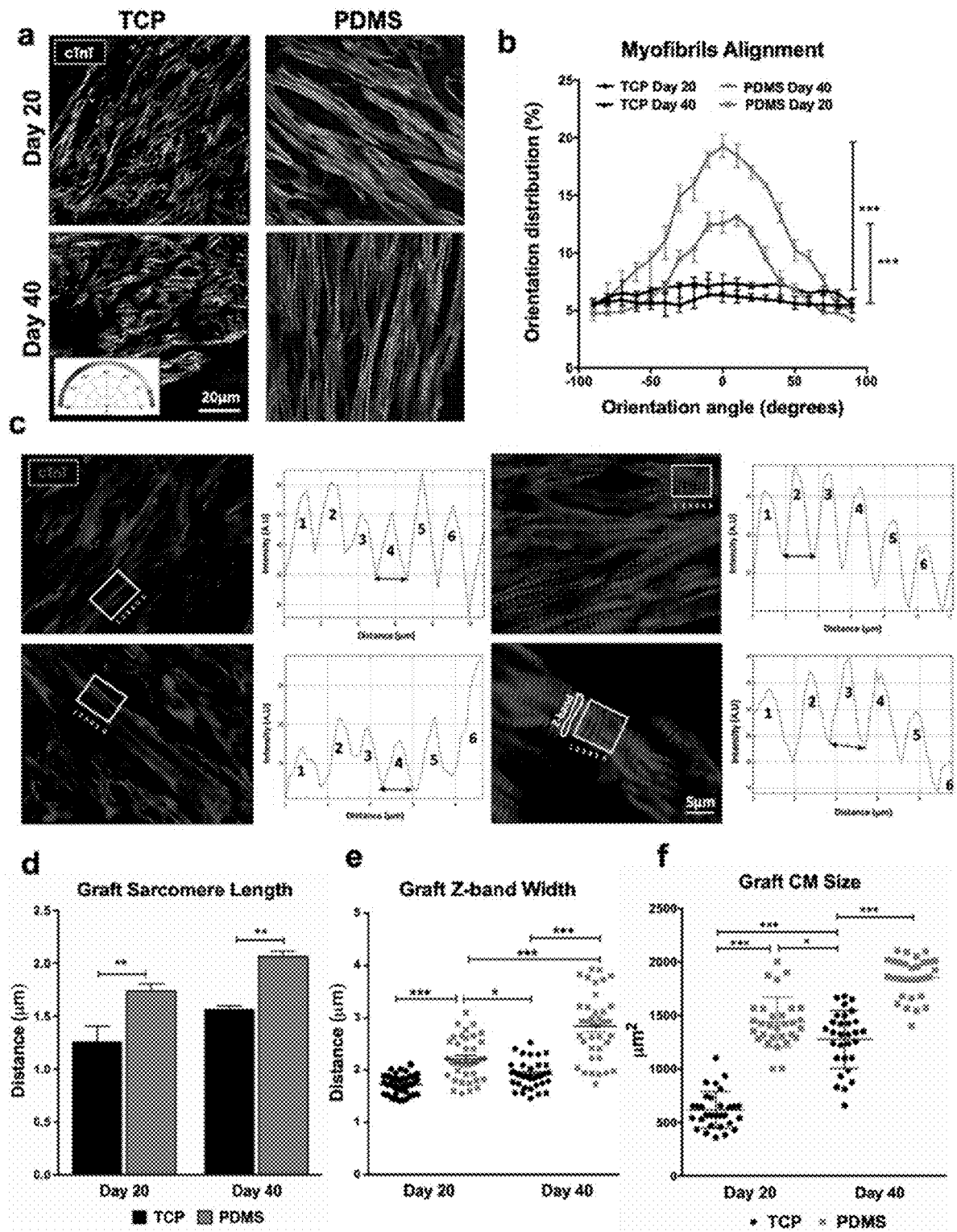
FIG. 8 shows that graft cardiomyocytes formed by the transplantation of PDMS-cultured hPSC-CMs exhibit enhanced sarcomeric structure relative to those formed by TCP-cultured myocytes. Panels a and c are magnified images of engrafted hPSC-CMs at 14 days after transplantation. Cardiac troponin T (cTnT) was used to detect sarcomeres. Graft alignment was characterized by analysis of the intracellular myofibril network obtained from stained cTnT cytoskeleton. Panels b-f show aligned myofibrils, sarcomere structure, sarcomere length, Z-bands, and cardiomyocyte size, respectively. All data are presented as mean±SEM (n=6 to 9 engrafted hearts per group). *=P<0.05, =P<0.01, *=P<0.001.

The data in FIG. 8 also show that grafted cells derived from PDMS cultures exhibited significant increases in graft myofibril alignment (panels a and b), well-defined sarcomere structure (panel c) and length (panel d), enhanced width of the Z-bands (panel e), and cardiomyocyte size (panel f), as compared to their TCP counterparts.

Figure 9:
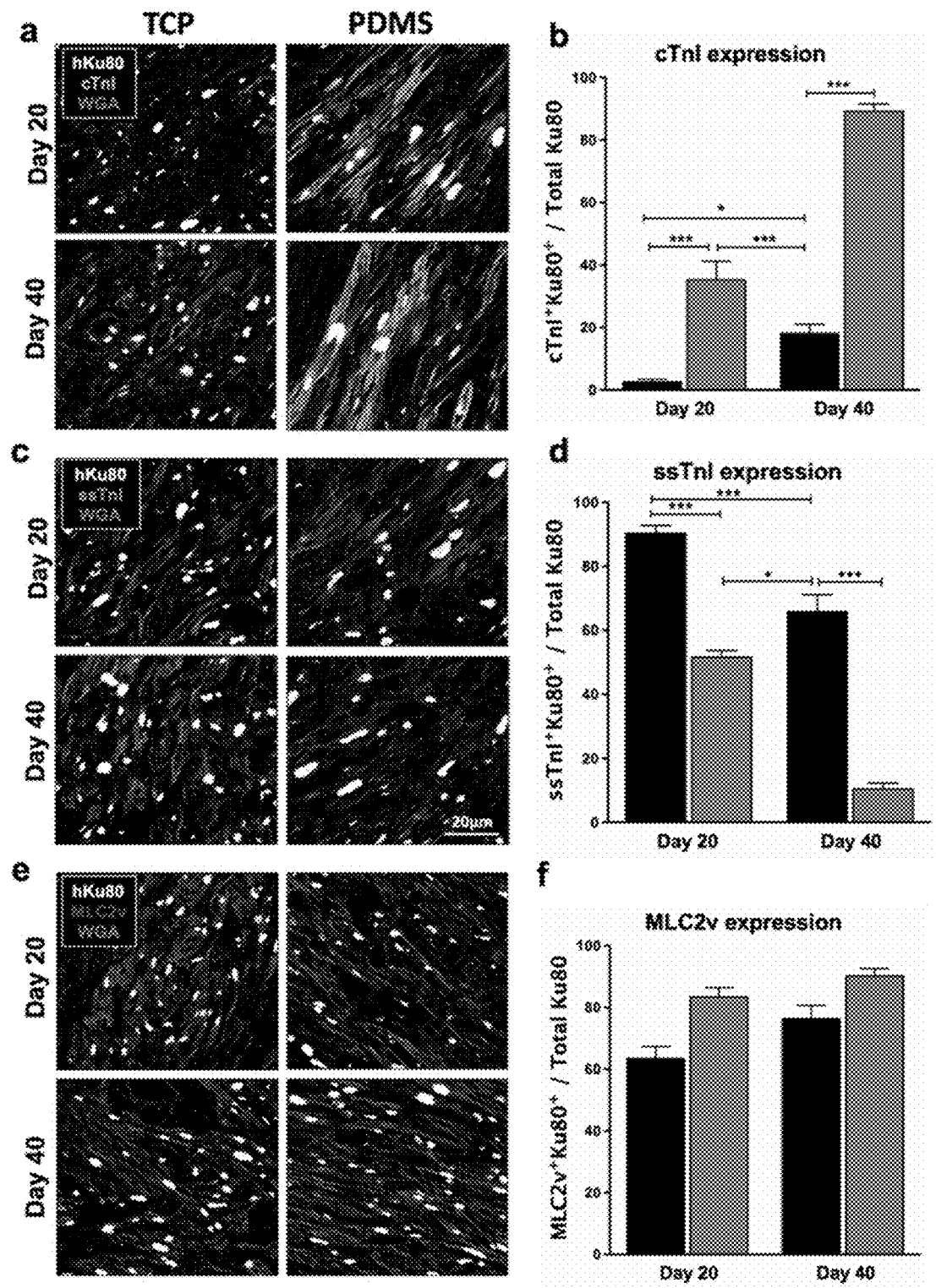
FIG. 9 shows that grafts in injured hearts formed with PDMS-cultured hPSC-CMs exhibit enhanced expression of sarcomeric maturation markers compared to those formed with TCP-cultured myocytes. Panel a, c, and e are magnified images of engrafted hPSC-CMs at 14 days after transplantation. Graft cardiomyocytes were identified by immunostaining for human Ku80, and wheat germ agglutinin (WGA) was used to delineate the sarcolemma, followed by immunostaining for maturation markers including cardiac TNI (cTNI, panel a), slow skeletal troponin I (ssTNI, panel c) and myosin light chain 2v (MLC2v, panel e). Panels b, d, and f depict quantitation of this staining in grafts formed with the four input cell populations. All data are presented as mean±SEM (n=6 to 9 engrafted hearts per group). *=P<0.05, =P<0.01, *=P<0.001.

Graft cardiomyocytes also showed increased expression of mature cardiac markers (FIG. 9). For example, most PDMS-derived graft myocytes expressed the adult isoform of cardiac troponin I (cTnI, ~40% and ~90% when formed with day 20 and day 40 PDMS cultures, respectively), while their TCP-derived counterparts largely expressed the immature slow skeletal troponin I (ssTnI) isoform d (~88% and ~65% when formed with day 20 and day 40 TCP cultures, respectively). When comparing the expression level of the ventricular myosin light chain marker (MLC2v), we also observed a trend toward enhanced expression in the PDMS hPSC-CM derived grafts (FIG. 9, panels e and f).

Figure 10:
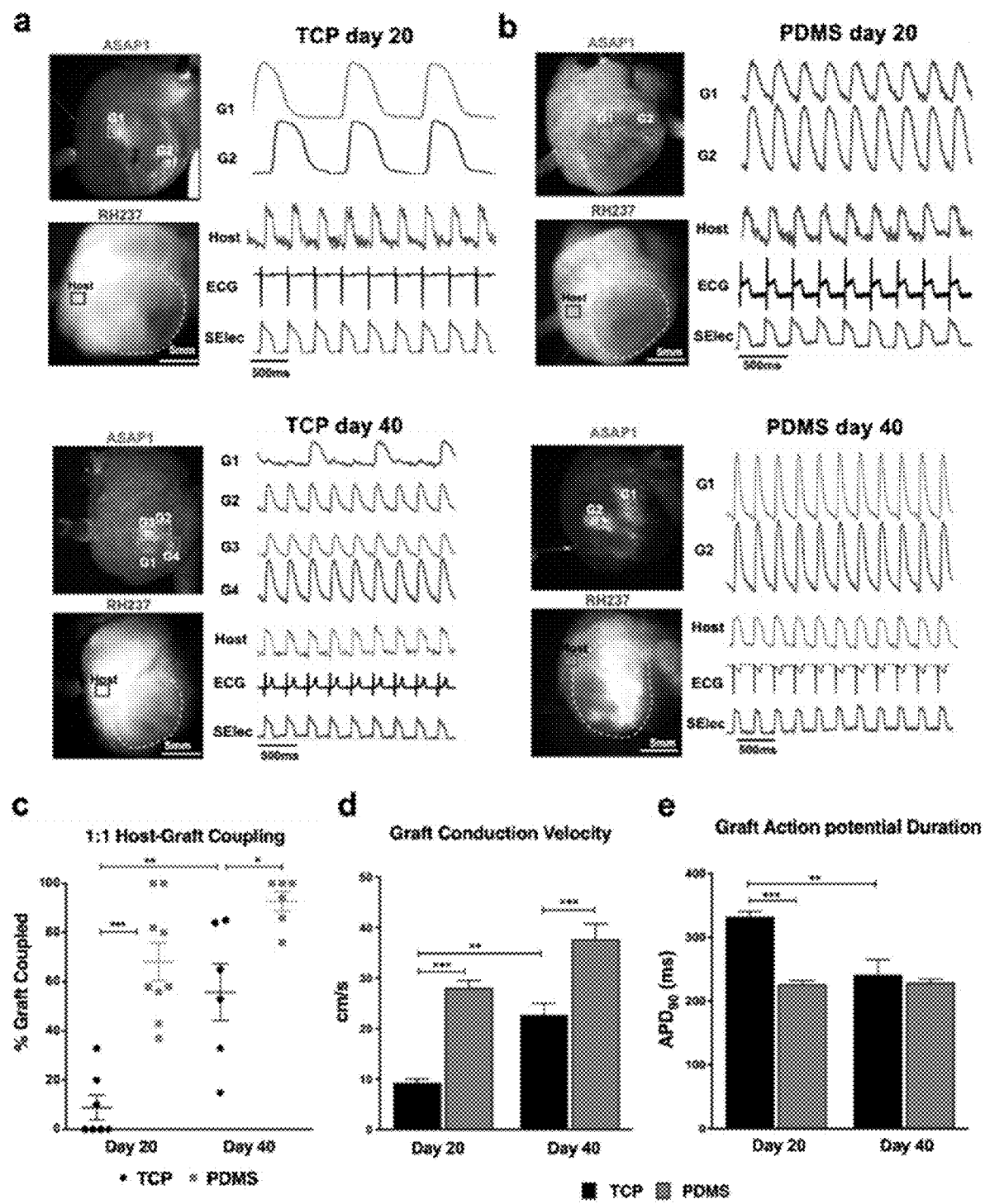
FIG. 10 shows that graft myocardium formed with PDMS-cultured hPSC-CMs exhibit enhanced electromechanical integration and more rapid propagation than those formed with TCP-cultured myocytes. Injured guinea pigs were transplanted with ASAP1$^+$ hPSC-CMs generated on either TCP or PDMS. The engrafted hearts were imaged ex vivo at 2 weeks post transplantation to acquire graft-derived (ASAP1) and host (red-shifted voltage-sensitive dye RH237) electrical signals. Data from representative hearts with TCP-cultured (panel a) or PDMS-cultured (panel b) hPSC-CM graft tissue are depicted with still images on each channel, graft-derived oAPs (ASAP1, green traces) for indicated graft regions of interest, host-derived oAPs (RH237, red traces), as well as the simultaneously recorded ECG and host sharp-electrode recordings (SElec). Panels c-e are plots depicting electrical coupling, conduction velocity, and action potential duration to 90% of repolarization (APD90), respectively, in grafts formed with the four input cell populations. All data are presented as mean±SEM (n=6 to 9 engrafted hearts per group). *=P<0.05, =P<0.01, *=P<0.001.

Most importantly, graft formed with PDMS-matured myocytes showed enhanced electrophysiological properties by optical mapping based on ASAP1 fluorescence (FIG. 10). The most relevant parameters included a better host-graft electromechanical integration (1:1 coupling with the host; FIG. 10, panels a and b) and more rapid and uniform conduction velocity (FIG. 10, panel c). While a 1:1 relationship between ASAP1 signal and host QRS complexes was nearly always observed in grafts formed with PDMS hPSC-CMs, grafts formed with their TCP counterparts were uncoupled from the host and from one another.

Thus, using the scalable maturation system described in Example 1, we were able to obtain the first evidence that the transplantation of more mature CMs actually resulted in tangible improvements in graft outcomes in a relevant animal of myocardial infarction (MI).

In summary, the results of the above studies demonstrate scalable, practical and economic methods to generate large quantities of mature hPSC-derived ventricular CMs. The results also show that PDMS-matured cardiomyocytes form large intramyocardial grafts with enhanced cardiac structure and greatly improved electrical function, indicating that CM maturation prior to transplantation meaningfully improves graft outcomes in vivo.

What is claimed is:

1. A method of generating a cell population enriched for mature ventricular cardiomyocytes, comprising:
    (a) providing an embryoid body comprising human cardiac progenitor cells, wherein the embryoid body is obtained by differentiating a human pluripotent stem cell (hPSC) for no more than 6 days,
    (b) dissociating the embryoid body to single cells,
    (c) seeding the single cells on a polydimethylsiloxane (PDMS) membrane, and
    (d) culturing the seeded cells in a cardiac base medium inside a tissue culture container for four or more days under conditions that allow development of the seeded cells into mature ventricular cardiomyocytes, thereby producing a cell population enriched for mature ventricular cardiomyocytes.

2. The method of claim 1, wherein the cardiac base medium is induced to move during the culturing.

3. The method of claim 1, wherein the hPSC is a human embryonic stem cell.

4. The method of claim 1, wherein the hPSC is a human induced pluripotent stem cell.

5. The method of claim 1, wherein the embryoid body is obtained by
    (i) culturing the hPSC for about 1-3 days in the presence of an activator of a bone morphogenetic protein 4 (BMP4) receptor, a fibroblast growth factor (FGF), and an activator of the Activin signaling pathway, and
    (ii) culturing the cell(s) from step (i) in the presence of a Wnt signaling antagonist for about 1-3 or more days.

6. The method of claim 5, wherein the embryoid body is obtained by
    (i) culturing the hPSC in the presence of BMP4, basic FGF, and Activin A for about 1-3 days, and
    (ii) culturing the cell(s) from step (i) in the presence of IWP2 and optionally VEGF for about 1-3 or more days.

7. The method of claim 1, wherein the embryoid body is obtained by
    (i) culturing the hPSC in the presence of one or more Wnt signaling agonists, and
    (ii) culturing the cell(s) from step (i) in the presence of one or more Wnt antagonists.

8. The method of claim 1, further comprising
    (e) culturing the cell(s) from step (d) in the presence of insulin for about one to four weeks.

9. The method of claim 1, wherein the substrate is coated with extracellular matrix proteins comprising one or more of laminins, collagens, heparin sulfate proteoglycans, fibronectin, vitronectin, and poly-1-dopamine; or coated with growth factor reduced extracellular matrix proteins.

10. The method of claim 1, wherein step (c) is performed with movement of the cardiac base medium.

11. The method of claim 10, wherein the substrate is alternately submerged in the cardiac base medium and exposed to air due to the movement.

12. The method of claim 1, wherein the volume of the cardiac base medium in step (c) is about 100 mL to about 500 L.

* * * * *